UNITED STATES PATENT OFFICE.

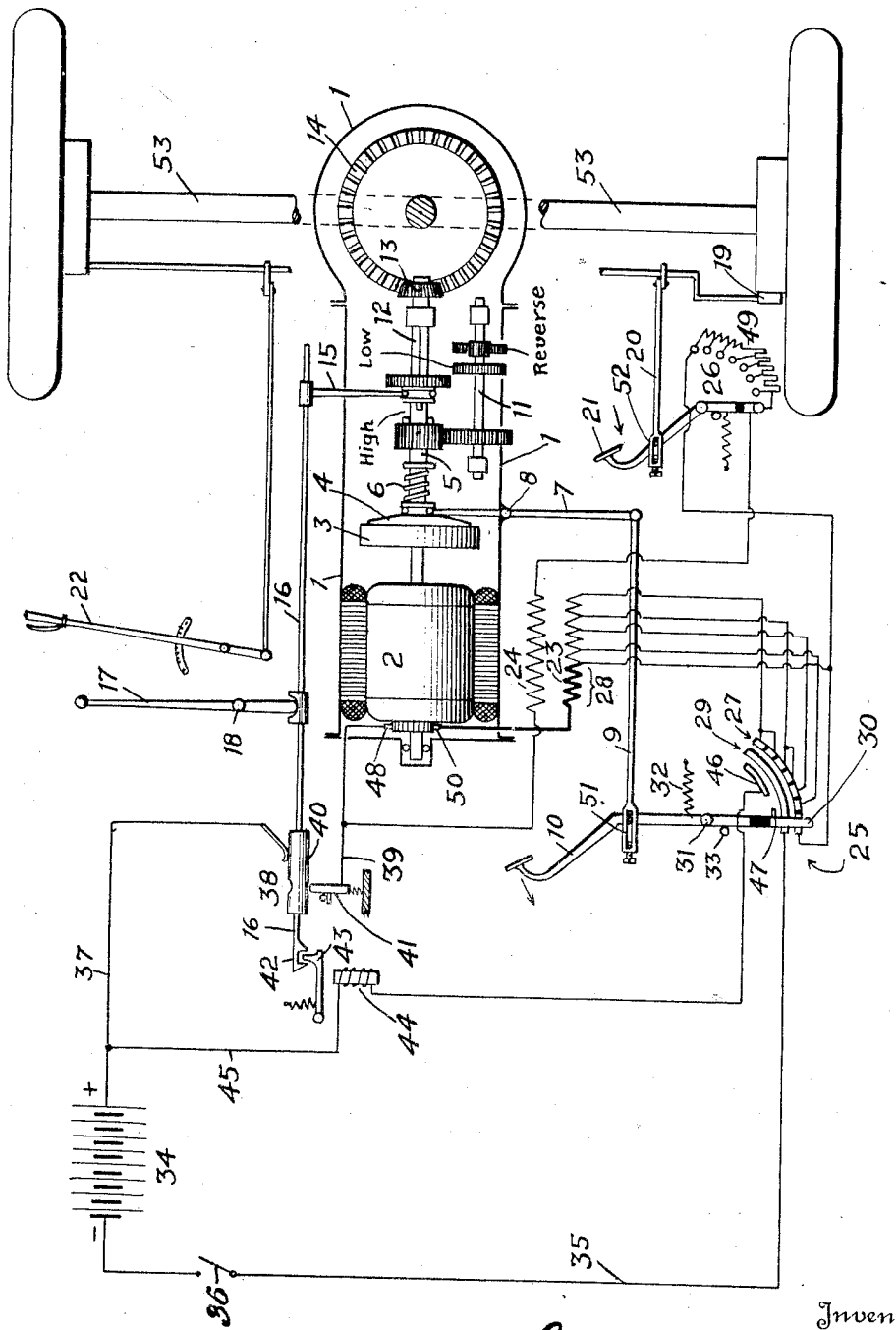

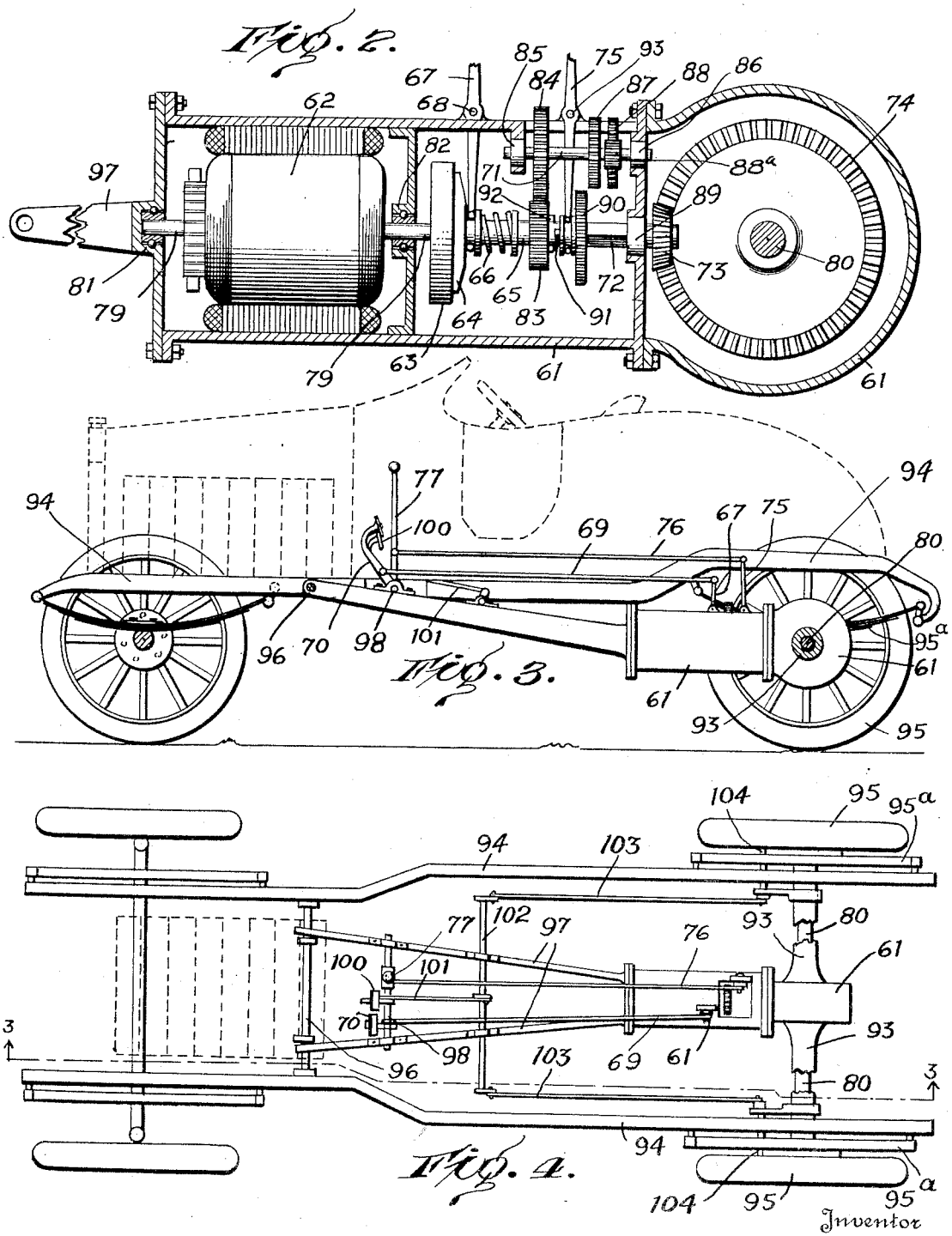

JAMES KENDALL DELANO, OF NEW YORK, N. Y.

ELECTRIC MOTOR VEHICLE.

1,423,090.  Specification of Letters Patent.  Patented July 18, 1922.

Application filed July 21, 1920. Serial No. 397,964.

*To all whom it may concern:*

Be it known that I, JAMES K. DELANO, a citizen of the United States, residing at New York, county of New York, and State of New York, have invented certain new and useful Improvements in Electric Motor Vehicles; and I do hereby declare the following to be a full, clear, and exact description of the invention, such as will enable others skilled in the art to which it appertains to make and use the same.

This invention relates to electric motor vehicles, and more particularly to systems of power and speed control therefor.

A principal object of the invention is to enable quick starting without unduly loading the motor or making excessive demand on the source of current supply, the motor operating at high efficiency at all times, whereby loss of energy heretofore incident to frequent starting and stopping in traffic is greatly reduced, the operation being controlled through simple controlling means automatically effecting the necessary correlation of electrical and mechanical adjustments. This object may be attained in various ways, but in one desirable specific embodiment of the invention, hereinafter illustrated for the sake of a concrete example, it is attained by progressively varying the electrical connections of the motor through suitable switching means operating in conjunction with the clutch operating lever or pedal arm in a manner to automatically vary the torque equation of the motor according to the nature of the work performed.

Another object is to provide a regenerative braking system in which the motor when acting as a generator, is rendered self-regulating to limit the amount of current delivered to the source and to provide means whereby, and when the opposing force required for braking exceeds that produced by regeneration, further movement of the brake control by the operator will result in an application of mechanical braking means in addition to the regenerative braking. This object may be accomplished in any suitable manner, as for example through the use of a variable resistance included in a shunt field winding on the generator, arranged to be operated in response to the movement of a friction brake control lever or arm.

Another object of the invention is to provide an arrangement wherein the foregoing features are combined in such manner that the vehicle operator may, by their conjoint use, control the movements of the vehicle in a manner analogous to that in which a vehicle propelled by a gasoline motor is controlled through the clutch and throttle or accelerator; and with the further advantage that, in the most desirable form of the invention, the function of braking can also be embodied in a 2-control system instead of requiring a separate third control as is customary in gas-propelled cars; thus making possible in an electric vehicle power economy not realized heretofore and accomplishing this result by simple and easily operated mechanism.

A further object, attained as will appear hereinafter, is to provide an improved form of unitary assemblage and mounting of power plant and driving connections which obviates the necessity for universal joints, with consequent increase in transmission efficiency and reduction of maintenance expense.

With the foregoing objects in view, as well as others which will be apparent as the description proceeds, the invention comprises the novel features, arrangements, and combinations of parts which will first be described, especially in connection with the desirable practical embodiment of the broad inventive principles illustrated in the accompanying drawings, and which will then be more particularly pointed out in the claims.

In the accompanying drawings:

Figure 1 shows more or less diagrammatically a combination and arrangement of circuits and apparatus embodying my improved system of control in an especially desirable form;

Figure 2 is a side view of the unitary power plant and driving connections with the casing, in section;

Figure 3 is a diagrammatic side view partly in section on the line 3—3 of Figure 4, showing the method of installing the unitary power plant and driving connections on a vehicle;

Figure 4 is a top plan view corresponding to Figure 3.

In its more general aspects, the system chosen to illustrate the principles of the invention comprises an electric motor adapted to drive the vehicle running gear and governed through separate motor-controllers which may be employed separately or conjointly, according to conditions of vehicle movement and to the effect desired to be produced therein at any given instant. More particularly, one of these controllers may be employed as a starting controller and power regulating means, and is most desirably mechanically connected to clutch-actuating means for operation in conjunction therewith; while the other controller is operable, when the vehicle speed attains or exceeds a predeterminable minimum, to compel the motor to act as a generator and to exert an electrical braking effect on the vehicle movement, this second controller being advantageously connected mechanically to mechanical braking means for operation in conjunction therewith.

Referring to the drawings in detail, and first to Fig. 1, the motor and all its driving connections including the differentials are, in this instance, mounted within and carried by a casing 1. The motor armature 2 has its shaft connected with the driving member 3 of a friction clutch, which may be of the fly-wheel cone type, the driven member 4 of the clutch being slidably mounted on the clutch shaft 5 in the usual manner and provided with a clutch spring 6 normally tending to hold the clutch members in engagement. The clutch is operated by a suitable forked clutch arm 7 pivoted at 8 and connected through a link 9 with the clutch pedal arm 10. The transmission, which may be of any known or suitable type, is here shown as sliding gear selective, two speed forward and reverse, comprising the counter-shaft 11 and driven shaft 12, operated from the clutch shaft 5 through the usual variable ratio gear connections, and indicated in the diagram by the legends, "High," "Low" and "Reverse." Carried directly by the shaft 12 is the drive pinion 13, engaging the differential gear 14, which may have the usual differential connection (not shown) with the axle shafts. Control of the transmission connections is effected through the forked arm 15, rod 16, and gear shift lever 17, the lever 17 being pivoted at 18 and operable to move the rod forward or back to effect the necessary speed change connections. A foot brake 19 is controlled through a brake rod 20 and clutch pedal 21, which pedal also controls certain electrical connections to be later described. For the sake of completeness the diagram also shows an emergency brake control lever 22 connected in the usual manner.

Referring now to the electrical devices and their circuit connections, the motor is provided with a series field winding 23, and a shunt field winding 24, connected for control by the controllers 25 and 26, respectively. The controller 25 has its individual segments 27 progressively tapped on to different portions of the series field winding 23, the first section 28 of which is the normal winding, the remaining sections being in excess. The individual segments 27 are successively connected with the common segment 29 through the controller contact arm 30, which is mechanically connected with but insulated from a downward extension of the clutch pedal arm 10 and arranged to slide over the segments as the clutch arm is rocked about its pivot 31. The controller is held normally in the position shown by means of the retractile spring 32 and stop 33. Connection is made between the common segment 29 and one terminal of the storage battery 34 through conductor 35 and master switch 36. The other side of the battery is connected with the motor through conductor 37, switch 38 and conductor 39. The switch 38 may be of any form operable to normally hold the motor circuit open when the gear shift is at neutral and to close the circuit when the gears are connected; and as here shown, the switch consists of a movable contact 40 carried by the rod 16 in a manner to be brought into contact with the contact 41 upon movement in either direction from the normal position shown.

In order to prevent movement of the gear shift lever while the clutch is engaged. I provide interlocking means, in this instance electromagnetic, between the gear shift and clutch, consisting of a recessed locking member 42 fixed on the end of the rod 16 and adapted to be engaged by a bolt or detent 43 normally held in locking engagement. The bolt 43 is arranged to be pulled out of locking engagement upon energization of the interlock release magnet 44. This release magnet has one terminal connected to one side of the battery through conductor 45, and the other connected to a contact segment 46 on the controller 25, the latter being arranged to be connected with the common segment 29 through a contact 47 carried by the switch arm 30, the segment 29 being so arranged that it can be engaged by the contact 47 only when the clutch is disengaged.

The shunt field winding 24 is connected between the upper brush 48 of the motor and the far terminal of the main section 28 of the series winding through the resistances 49 of the controller 26, near terminal of the series winding being connected to the lower brush 50 of the motor. The shunt and series field windings are so connected as to act cumulatively when the armature runs as a motor and differentially when the armature is driven as a generator. To enable the clutch controller switch 25 to be moved to a certain extent before operation of the clutch, the clutch link 9 is connected to the arm 10 through a suitable adjustable lost-motion connection 51. For similar reasons, a similar connection 52 is provided between the brake rod 20 and the foot brake pedal.

The operation is as follows: Assuming the parts to be in the position shown, which is the neutral or standing position, to start the vehicle the operator depresses the clutch pedal, which acts through the link 9 to disengage the clutch, and which causes the controller arm 30 to move to the right into engagement with the extreme right hand segments, at the same time closing the energizing circuit of the interlock release magnet 44 through contacts 46 and 47. Release magnet 44 being thus energized pulls the bolt 43 out of engagement with the recessed member 42, unlocking the gear shift. The operator now operates the gear shift lever 17 in a direction, for example, to move the rod 16 forward, or to the left in Fig. 1 which connects the transmission in high, assuming the start is to be made on a level or down grade. This movement of the rod 16 brings the contacts 40 and 41 into engagement closing the motor circuit, current traversing all the turns of the series field winding 23, the controller arm 30 being at the right hand end of the series of individual segments 27, resulting in maximum field strength and high starting torque. The circuit for this setting of the parts may be traced from positive side of battery 34, conductor 37 contacts 40—41, conductor 39, brush 48, armature 2, brush 50, all turns of series field winding 23, contacts of controller 25, conductor 35 and master switch 36 back to battery 34. The shunt winding 24, being connected in shunt around the brush 48 and section 28 of the series winding, also receives current. The motor now attains a maximum speed, say 1500 R. P. M., determined by the shunt winding, but is still unconnected to the vehicle running gear. The clutch is next eased in by gradually releasing the clutch pedal, the stored momentum of the armature assisting the motor torque and thus reducing the amount of energy drawn from the battery in starting the vehicle from rest. After engagement of the clutch, the controller arm continues to move toward the left under the tension of the spring 32, until the stop 33 causes it to come to rest on the extreme left hand member of the series of segments 27 which is the full speed position segment. During this movement, all the excess series field turns are successfully cut out. This brings the car to a speed, for example, of thirty miles an hour if required, or if control pedal 21 is not actuated, as hereinafter described, to reduce the speed to the requirements of the operator.

To control the speed of the car, the operator may now make use of the foot brake pedal 21 which in addition to controlling the mechanical brake 19, performs a further function similar to that of the throttle or accelerator of a gas car. By pushing on this pedal in the direction of the arrow, the rheostat is operated to successively cut out the resistance 49 included in the shunt field circuit, which slows down the armature. The farther in the foot brake is pushed, the slower will be the speed of the armature, the shunt field being wound so as to be predominant and to oversaturate the field when directly across the line without the resistance 49 in series with it. This slows down the motor; and if the vehicle speed be sufficient at the moment, the motor is driven by the vehicle, and acts as a generator to charge the battery, while at the same time exerting a useful braking action on the vehicle. Thus, as the vehicle is getting away, if acceleration is too rapid as effected by means of the clutch pedal, the operator may push down on the foot brake without actually bringing the mechanical brake into play, and may thus cause the vehicle to attain a sufficiently reduced speed to meet requirements, merely by the electrical braking effect of the motor acting as a generator. Again assuming the vehicle to be moving in traffic, and a stop to be made within sixty feet from a speed of twenty miles an hour, the operator pushes down part way on the foot brake which increases the strength of the shunt field and slows down the motor, causing a generating effect to be produced between the armature and shunt field winding, the armature being driven by its own momentum and that of the vehicle. The current thus produced goes to replace the battery charge while the electrical load on the armature acts to brake the speed. As the speed decreases, the rate of charge drops off, becomes zero, and the motor again takes current from the battery. To bring the vehicle to a stop, the clutch is eased out to disconnect the motor from the driving gear, and the foot brake pedal pushed down further to take up the lost motion between it and the brake rod 20, which results in setting the mechanical brake 19. The motor now idles.

During regenerative braking, the rate of recharge cannot at any time become excessive due to the fact that at such time the series field acts differentially to limit the charging current.

To start the car again, the foot brake is eased out and the clutch allowed to engage gradually as before described.

The operation in low or reverse gear is the same in principle as in high gear, and is apparent without further explanation.

From the foregoing it will be seen that the control is similar to that of a gas car except that the brake pedal additionally performs a function similar to that of the accelerator pedal of the gas car, thus obviating the necessity for shifting the foot between brake pedal and accelerator.

It will also be seen that complete control may be had in down grade coasting with full regenerative effect, the mechanical brake coming into operation automatically when the demand for braking force exceeds the maximum regenerative braking effect.

For the sake of simplicity I have shown the reverse control delegated to the transmission as in a gas car, but it will be understood that this control may be effected electrically by reversing the motor in any suitable manner that would suggest itself to those skilled in the art. It is further to be noted that instead of an electrical control of the interlock between the clutch and gear shift, a mechanical interlock of any known or suitable type adaptable to the purpose may be used, operable for example by a suitable mechanical connection to the clutch pedal. Moreover, in another form which the broad invention may take, the variable resistance 26 may be operated by another pedal, similar to the accelerator pedal of a gas car, separate from brake pedal 21.

Referring now to the power plant arrangement and mounting, which constitutes a part of my invention, a preferred embodiment is shown in Figs. 2 to 4 and consists in a common rigid support 61 preferably in the form of a casing, as shown, enclosing and supporting as a unit the entire motive means and various power transmission means between it and the driving shafts 80. The motor is indicated at 62, various details such as brush holders, leads, etc., being omitted for clearness. The motor armature shaft 79 is mounted in bearings 81 and 82, extending through the bearing 82 at the far side of which it carries the driving member 63 of a suitable clutch, here shown as a cone clutch. The driven member 64 of the clutch is mounted on the clutch shaft 65 in the usual manner so as to slide thereon but to carry the shaft with it in rotating. A clutch spring 66 is provided for holding the clutch engaged, the movable member 64 being operated by means of the forked arm 67 pivoted on the upper wall of the casing at 68.

To the right of the clutch mechanism, is the variable ratio transmission assemblage consisting of the gear 83 carried near the end of the clutch shaft and transmitting motion to the counter-shaft 71 through a gear 84. The counter-shaft is journaled in bearings 85 and 86 mounted in the casing 61. The usual low gear 87 and reverse idler 88 are provided, gear 87 being mounted on the counter-shaft, and idler 88 being driven from said shaft by pinion 88ª thereon. Mounted co-axially with the clutch shaft is the squared shaft 72 journaled at the left hand end in the end of the clutch shaft in the usual manner (not shown), and journaled at the right hand end in the bearing 89. Slidably mounted on the shaft 72 is the shift gear 90 arranged to slide into engagement with the gears 87 and 88 and carrying a toothed clutch member 91 adapted to engage a complementary clutch member 92 on the clutch shaft. The shift gear 90 is operated by a forked arm 75 pivoted at 93 to the casing 61. Connected directly to the shaft 72 is the differential drive pinion 73 which meshes with the main differential gear 74 mounted in the right hand end of the casing 61. The gear 74 is connected with the driving axles 80 through the usual differential connection, not shown, which may be mounted in and supported by the rear end of the casing 61 in the same manner as the usual differential is supported by its casing or housing.

The method of installing the motor and transmission assemblage on a vehicle is shown in Figs. 3 and 4, where 94 indicates the frame of an automobile, 95 the rear or driving wheels and 95ª the rear springs through which the frame may be supported by the rear wheels in the usual manner. The rear end of the casing 61 is supported by the driving wheels through the drive shaft casing 93, independently of the springs, in the same manner as the usual differential housing is supported where a full floating axle is used. With any other form of axle the mounting would be the same as that of the usual differential housing with that form of axle. The forward end of the casing 61 is supported by the frame 94 through the transverse bar 96 and supporting arm 97, the latter being fastened to the forward end of the casing 61 and pivotally connected with the bar 96 to permit the casing to oscillate vertically in relation to the frame. Any suitable arrangement for permitting twisting of the casing due to unequal vertical movement of the rear wheels may be used in the connection of the arms 97 with the bar 96, or of the bar 96 with the frame.

The gear shift lever 77 and clutch pedal 70 are pivotally mounted on a cross member 98 mounted on the arms 97, the clutch pedal 70 and gear shift 77 being connected through links 69 and 76, with the forked arms 67 and 75, respectively.

The foot brake 100 is pivoted on the pivot bar 98 in the usual position between the clutch pedal and gear shift and is connected through link 101, rock shaft 102 and links 103 to the service brakes 104.

As the purpose of Figs. 3 and 4 is to illustrate more or less diagrammatically the method of installing the motor and transmission unit on a vehicle frame, all electrical connections and controls are omitted therefrom, the method of installing which will be readily understood by referring to Fig. 1 and its description.

It will be seen that by assembling the motor and entire transmission as a unit supported in the manner disclosed, the necessity for universal joints between the variable ratio transmission and the differential is eliminated with its accompanying maintenance expense and loss of efficiency, and the essential parts brought together in a sturdy and compact assemblage readily accessible for adjustments and repair.

It is to be understood that various details such as means for lubricating the gears and bearings, not shown, may be supplied in practice in any appropriate known or suitable form.

It is also to be understood that while I have herein shown and described a specific embodiment of my invention for the purpose of a concrete explanatory example, the invention is not limited thereto but contemplates all such modifications and variations as fairly fall within the scope of the appended claims. For example, other electrical means of controlling the operation of the motor through the clutch and brake pedals, respectively, may be adopted without sacrificing all or any of the benefits of the invention.

What I claim is:

1. The combination with vehicle running gear and an electric motor therefor, of a starting motor-controller, operable to gradually decrease the field strength, and a running motor-controller operable to gradually increase the field strength.

2. The combination with vehicle running gear and an electric motor therefor, of series and shunt field windings for the motor, a starting controller operable to vary the number of turns in the series field winding, and a running controller operable to vary the resistance of the shunt field circuit.

3. The combination, with vehicle running gear, and an electric motor, a source of current supply connected to said motor, and clutch means operable to connect or disconnect said running gear and motor, of actuating means for said clutch means, and means for variably controlling the motor field, such controlling means being connected to and operable by said actuating means.

4. The combination, with vehicle running gear, an electric motor, and clutch means operable to connect or disconnect said running gear and motor, of motor-controlling means connected to and operable in conjunction with said clutch means, mechanical brake means operable to act upon said running gear, and further motor-controlling means connected to and operable in conjunction with said mechanical brake means.

5. In a motor vehicle having an electric motor connected with driving wheels by means of a clutch through a variable speed transmission, a source of current for the motor and an operating lever for the clutch; the combination of electrical switching means between the source of current and the motor operable by the clutch lever to gradually vary the field strength of the motor in proportion to the extent of movement of said lever.

6. In a motor vehicle, the combination with an electric motor and a source of current therefor, of variable speed transmission means connected between the motor and the vehicle drive wheels, clutch means for connecting said motor with said transmission, operating means for said clutch, and means for gradually varying the motor torque in proportion to the amount of movement of said clutch operating means.

7. In a motor vehicle, the combination with an electric motor and a source of current therefor, of variable speed transmission means connected between the motor and the vehicle drive wheels, clutch means for connecting said motor with said transmission, operating means for said clutch, means for gradually varying the motor speed in proportion to the amount of movement of said clutch operating means, controlling means for said transmission, and interlock means between said transmission control and said clutch operable to lock said transmission control against movement during engagement of the clutch.

8. In a motor vehicle, the combination with an electric motor and a source of current therefor, of clutch means for connecting the motor with the vehicle drive wheels, operating means for said clutch, means connected with such clutch-operating means and operable to vary the motor torque in proportion to the amount of movement of said clutch operating means, said clutch and operating means having a predetermined amount of lost motion between them.

9. In a motor vehicle having an electric motor connected by means of a clutch with the vehicle driving wheels, a source of current, an operating lever for the clutch, and a brake and operating lever therefor; the combination of series and shunt windings for the motor field, electrical switching means arranged to vary the magnetizing effect of said series winding in proportion to the amount of movement of the clutch lever, and a second electrical switching means arranged to vary the magnetizing effect of said shunt winding in proportion to the amount of movement of the brake lever.

10. The combination, with vehicle running gear, and an electric motor, a source of current supply connected to said motor, and clutch means operable to connect or disconnect said running gear and motor, of actuating means for said clutch means, and means for variably controlling the motor field, such controlling means being connected to and operable by said actuating means, said series and shunt windings being arranged to have a differential magnetizing effect when the motor is driven as a generator.

11. In a motor vehicle, having an electric motor connected by means of a clutch to the vehicle driving wheels, a source of current for the motor, an operating lever for the clutch, and a brake and operating lever therefor; the combination of series and shunt windings for the motor field arranged to have a differential magnetizing effect when the motor is driven as a generator, electrical connections and switching means arranged to decrease the magnetizing effect of the series winding in proportion to the amount of movement of the clutch lever in a clutch-engaging direction, and a second electrical switching means arranged to increase the magnetizing effect of the shunt winding in proportion to the amount of movement of the brake lever in a brake-engaging direction, whereby upon movement of the brake lever in a brake-engaging direction with the clutch engaged the shunt winding will predominate and the motor will act as a shunt generator, to deliver current to said source and exert a braking effect on the vehicle, said series winding acting to limit the generator output.

12. In a motor vehicle having a body frame supported upon a pair of driving wheels through resilient supporting means, the combination of a motor operatively connected with the driving wheels through a clutch, variable ratio transmission and differential gear, together with a common housing and supporting means for the same supported at one end by the driving wheels independently of said resilient means and at the other end by said frame, the axes of rotation of said motor, clutch, transmission and differential gear being fixed in relation to said driving wheels, and combined mechanical and electrical power control means mounted upon said common supporting means.

13. The combination, with vehicle running gear, an electric motor, a clutch operable to connect or disconnect said running gear and motor, and a pedal for operating the clutch, of a motor-starting controller mechanically connected to and operable by the clutch pedal, a running controller for the motor, and a second pedal adjacent the first mentioned pedal for operating said running controller.

In testimony whereof I hereunto affix my signature.

JAMES KENDALL DELANO.